(12) United States Patent
Teramachi et al.

(10) Patent No.: US 8,220,353 B2
(45) Date of Patent: Jul. 17, 2012

(54) SCREW DEVICE MANUFACTURING METHOD AND SCREW DEVICE

(75) Inventors: Akihiro Teramachi, Tokyo (JP); Takeki Shirai, Tokyo (JP); Yuji Tachikake, Tokyo (JP)

(73) Assignee: THK Co., Ltd., Tokyo (JP)

( * ) Notice: Subject to any disclaimer, the term of this patent is extended or adjusted under 35 U.S.C. 154(b) by 691 days.

(21) Appl. No.: 11/997,210

(22) PCT Filed: Jul. 4, 2006

(86) PCT No.: PCT/JP2006/313276
§ 371 (c)(1),
(2), (4) Date: Oct. 10, 2008

(87) PCT Pub. No.: WO2007/013266
PCT Pub. Date: Feb. 1, 2007

(65) Prior Publication Data
US 2010/0101348 A1    Apr. 29, 2010

(30) Foreign Application Priority Data

Jul. 29, 2005   (JP) ................................ 2005-221071

(51) Int. Cl.
*F16H 1/24* (2006.01)
*F16H 55/02* (2006.01)
*B21D 53/00* (2006.01)
*B21K 1/76* (2006.01)
*B29D 33/00* (2010.01)

(52) U.S. Cl. ............. 74/424.86; 74/424.82; 29/898.056; 29/898.057

(58) Field of Classification Search ................ 74/424.81, 74/424.82, 424.86, 424.87; 29/898.056, 29/898.057
See application file for complete search history.

(56) References Cited

U.S. PATENT DOCUMENTS

| | | | | |
|---|---|---|---|---|
| 2,581,482 A | * | 1/1952 | Hawkins | 74/424.82 |
| 3,006,212 A | * | 10/1961 | Gaionska | 74/424.82 |
| 3,009,367 A | * | 11/1961 | Striggow | 74/424.86 |

(Continued)

FOREIGN PATENT DOCUMENTS

| | | |
|---|---|---|
| DE | 100 28 968 A1 | 12/2001 |
| JP | 49-50359 A | 5/1974 |
| JP | 56-46158 A | 4/1981 |
| JP | 58-52358 U | 4/1983 |

(Continued)

OTHER PUBLICATIONS

Supplementary European Search Report dated Feb. 15, 2011, issued in corresponding European Patent Application No. 06767807.8.
International Preliminary Report on Patentability (English translation form PCT/IPEA/409) of International Application No. PCT/JP2006/313276 with an international filed of Jul. 4, 2006.
International Search Report of PCT/JP2006/313276, date of mailing Aug. 8, 2006.

*Primary Examiner* — Justin Krause
(74) *Attorney, Agent, or Firm* — Westerman, Hattori, Daniels & Adrian, LLP

(57) ABSTRACT

A screw device manufacturing method ensures high productivity and adequate nut strength. The disclosed screw shaft manufacturing method includes: a groove forming step of forming a loaded ball rolling groove in a flat plate; and a nut forming step of bending the flat plate into a ring to form a nut. As the groove forming step of forming of the loaded ball rolling in the flat plate is followed by the nut forming step of bending the flat plate into a ring, sufficient strength of the nut can be easily achieved. Besides, a high compression stress is left in the loaded ball rolling groove in the inner surface of the nut.

4 Claims, 10 Drawing Sheets

U.S. PATENT DOCUMENTS

| | | |
|---|---|---|
| 3,455,004 A | 7/1969 | Tethal |
| 4,364,282 A | 12/1982 | Nilsson |
| 4,439,011 A * | 3/1984 | Machmerth .................. 359/825 |
| 4,612,817 A * | 9/1986 | Neff ........................... 74/424.75 |
| 6,192,585 B1 | 2/2001 | Buchanan, Jr. et al. |
| 6,334,370 B1 * | 1/2002 | Sonoda et al. ............. 74/424.81 |
| 2004/0154421 A1 * | 8/2004 | Pfister ....................... 74/424.82 |

FOREIGN PATENT DOCUMENTS

| | | |
|---|---|---|
| JP | 2-199347 A | 8/1990 |
| JP | 2005-83549 A | 3/2005 |
| WO | 2005/026580 A1 | 3/2005 |

* cited by examiner 5 return groove     2a loaded ball rolling groove     5 return groove

SCREW DEVICE MANUFACTURING METHOD AND SCREW DEVICE

TECHNICAL FIELD

The present invention relates to a screw device having a screw shaft, a nut and rolling elements rollably disposed therebetween.

BACKGROUND ART

While electric power steering devices are coming into general use, there are growing demands for a thinner nut and a simple circulation structure thereof. As a trend, a deflector-type ball screw becomes mainstream. In the deflector-type ball screw, a deflector (also called "piece") is embedded in the nut to circulate balls. In the deflector, there is formed a return groove that connects both ends of a loaded ball rolling groove of less than one turn. Then, the return groove of the deflector acts to make each ball, which is rolling in the loaded ball rolling groove spirally formed around the screw shaft, go over a thread of the screw shaft before the ball revolves completely around the screw shaft and return back to a starting point of the loaded ball rolling groove.

For the purpose of reducing possible damage of the deflector and manufacturing costs, there has been devised a ball screw having less component count. For example, the patent document 1 discloses a ball screw having a loaded ball rolling groove and a ball return groove integrally formed in a semicircle-shaped nut by molding. According to the invention disclosed in the patent document 1, the loaded ball rolling groove and the ball return groove are formed at the same time when the nut is half-rounded.

In addition, the patent document 2 discloses "a ball screw, which is easy to form and assemble, comprising a screw shaft having an outer surface with a spiral groove formed thereon, a ball nut having an inner surface with a spiral groove formed thereon facing the spiral groove of the screw shaft and a plurality of balls arranged rollably between the spiral groove of the ball nut and the spiral groove of the screw shaft, characterized in that the ball nut has an inner circulation path (corresponding to a return groove) which is connected to the spiral groove and consists in a circular ball path inside the ball nut, and the ball nut is axially cut at a part of its circumference with a radially cut area passing through the inner circulation path" (see patent document 2, claims for Utility Model). This patent document 2 also discloses "a tubular member 6 of the ball nut which is axially cut at a part of the circumference and therefore, easily detached from a mold by opening up the cut area 8 even when it is formed by plastic forming with a male mold (patent document 2, page 5, lines 7-11).

Patent document 1: Japanese patent laid-open publication No. 56-46158
Patent document 2: Japanese utility model laid-open publication No. 58-52358

DISCLOSURE OF THE INVENTION

Problems to be Solved by the Invention

The ball screws described in these documents have an advantage of high productivity as their ball screw nuts are formed by molding. On the other hand, they present a problem of difficulty in achieving adequate strength of the ball screw nut. Particularly, the ball screw disclosed in the patent document 2 utilizes a plate member that is thin enough to be easily opened at the cut area when the ball screw nut is detached from the male mold. As the ball screw nut does not serve as a nut by itself, it is reinforced with a resin or outer casing.

Therefore, the present invention has an object to provide a screw device manufacturing method and a screw device which ensure high productivity and adequate nut strength.

Means for Solving the Problems

In order to solve the above-mentioned problems, the invention of claim 1 is a screw device manufacturing method of a screw device having a plurality of rolling elements disposed between a spiral rolling-element rolling groove of a screw shaft and a spiral loaded rolling-element rolling groove of a nut facing the rolling-element rolling groove of the screw shaft, comprising: a groove forming step of forming the loaded rolling-element rolling groove in a flat plate; and a nut forming step of forming the nut by bending the flat plate into a ring. In order to solve the above-mentioned problems, a screw device manufacturing method of a screw device having a plurality of rolling elements disposed between a spiral rolling-element rolling groove of a screw shaft and a spiral loaded rolling-element rolling groove of a nut facing the rolling-element rolling groove of the screw shaft, comprises a groove forming step of forming the loaded rolling-element rolling groove in a flat plate; and a nut forming step of forming the nut by bending the flat plate into a ring.

Further, in the screw device manufacturing method described above, the nut has at least one one-turn groove including the loaded rolling-element rolling groove of less than one turn facing the rolling-element rolling groove of the screw shaft and a return groove connecting both ends of the loaded rolling-element rolling groove, and in the groove forming step, the at least one one-turn groove is formed in the flat plate.

Also, in the screw device manufacturing method described immediately above, in the nut forming step, the return groove is positioned at a joint of the nut formed into a ring.

Still further, in the screw device manufacturing method described above, in the groove forming step, the at least one one-turn groove is formed in the flat plate by cutting.

Still further, in the screw device manufacturing method described above, in the groove forming step, the at least one one-turn groove is formed in the flat plate by press working.

Still further, the screw device manufacturing method described above includes a reinforcing member forming step of forming a reinforcing member around the nut.

Additionally, a screw device comprises a screw shaft having an outer surface with a rolling-element rolling groove spirally formed thereon; a nut having an inner surface with a loaded rolling-element rolling groove formed thereon facing the rolling-element rolling groove of the screw shaft; and a plurality of rolling elements disposed between the rolling-element rolling groove of the screw shaft and the loaded rolling-element rolling groove of the nut, wherein the loaded rolling-element rolling groove is first formed in a flat plate and the nut is formed by bending the flat plate into a ring.

In the screw device described above, the nut has at least one one-turn groove including the loaded rolling-element rolling groove of less than one turn facing the rolling-element rolling groove of the screw shaft and a return groove connecting both ends of the loaded rolling-element rolling groove, and the at least one one-turn groove is formed in the flat plate.

Also, in the screw device described above, the return groove is positioned at a joint of the nut formed into a ring.

Effects of the Invention

As the groove forming step of forming the loaded rolling-element rolling groove in the flat plate is followed by the nut forming step of bending the flat plate into a ring, the adequate strength of the nut can be easily achieved. Besides, it is possible to keep a high compression stress left in the loaded ball rolling groove in the inner surface of the nut.

The loaded rolling-element rolling groove and the return groove formed in the nut can consist in a rolling-element circulation path.

It is possible to stabilize the dimensions of the loaded rolling-element rolling groove and the return groove formed in the nut. As the flat plate is bent into a ring by plastic forming, the planar shapes of the loaded rolling-element rolling groove and the return groove before the flat plate is bent are different from those after the flat plate is bent. In other words, a longitudinally center portion of the flat plate is deformed largely in the longitudinal direction, while longitudinally edge portions of the flat plate are not much deformed as they become free when the flat plate is bent. The return groove has a unique shape as compared with the loaded rolling-element rolling groove. As the return groove of unique shape is placed at both ends of the flat plate, it is possible to stabilize the planar shapes of the return groove and loaded rolling-element rolling groove between both sides of the return groove.

As the one-turn groove is formed in the flat plate by cutting, the flat plate can be made thicker thereby to increase the nut strength.

As the one-turn groove is formed in the flat plate by press working, it is possible to increase the nut productivity.

It is possible to ensure the adequate nut strength.

As the groove forming step of forming the loaded rolling-element rolling groove in the flat plate is followed by the nut forming step of bending the flat plate into a ring, the adequate strength of the nut can be easily ensured. Besides, it is possible to keep a high compression stress left in the loaded rolling-element rolling groove in the inner surface of the nut.

The loaded rolling-element rolling groove and the return groove formed in the nut can consist in a rolling-element circulation path.

It is possible to stabilize the dimensions of the loaded rolling-element rolling groove and the return groove formed in the nut. As the flat plate is bent into a ring by plastic forming, the planar shapes of the loaded rolling-element rolling groove and the return groove before the flat plate is bent are different from those after the flat plate is bent. In other words, a longitudinally center portion of the flat plate is deformed largely in the longitudinal direction, while longitudinally edge portions of the flat plate are not much deformed as they become free when the flat plate is bent. The return groove has a unique shape as compared with the loaded rolling-element rolling groove. As the return groove of unique shape is placed at both ends of the flat plate, it is possible to stabilize the planar shapes of the return groove and the loaded rolling-element rolling groove between both sides of the return groove.

DESCRIPTION OF REFERENCE NUMERALS

1 . . . screw shaft
1*a* . . . ball rolling groove (rolling-element rolling groove)
2, 24, 26, 36 . . . nut
2*a*, 14, 32 . . . loaded ball rolling groove (loaded rolling-element rolling groove)
3 . . . ball rolling path (rolling-element rolling path)
4 . . . ball (rolling element)
5, 15, 18, 29, 33 . . . return groove
8, 12, 20, 22, 28, 31 . . . flat plate
8*a* . . . one side
8*b* . . . opposite side
8*c* . . . another side
9, 13, 19, 30, 34 . . one-turn groove
10 . . joint
38 . . . housing (reinforcing member)

BEST MODE FOR CARRYING OUT THE INVENTION

Figure 1:
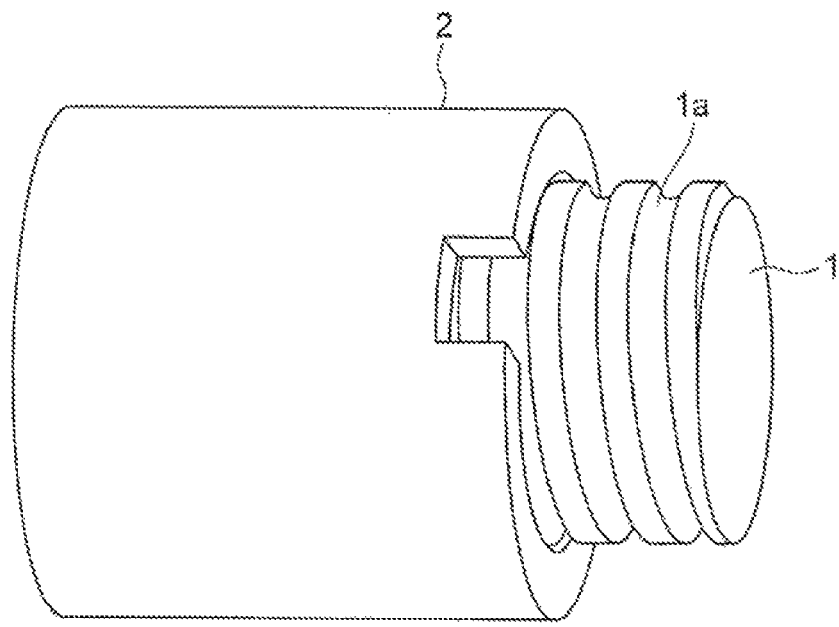
FIG. 1 is a perspective view of a screw device according to an embodiment of the present invention.
Figure 2:
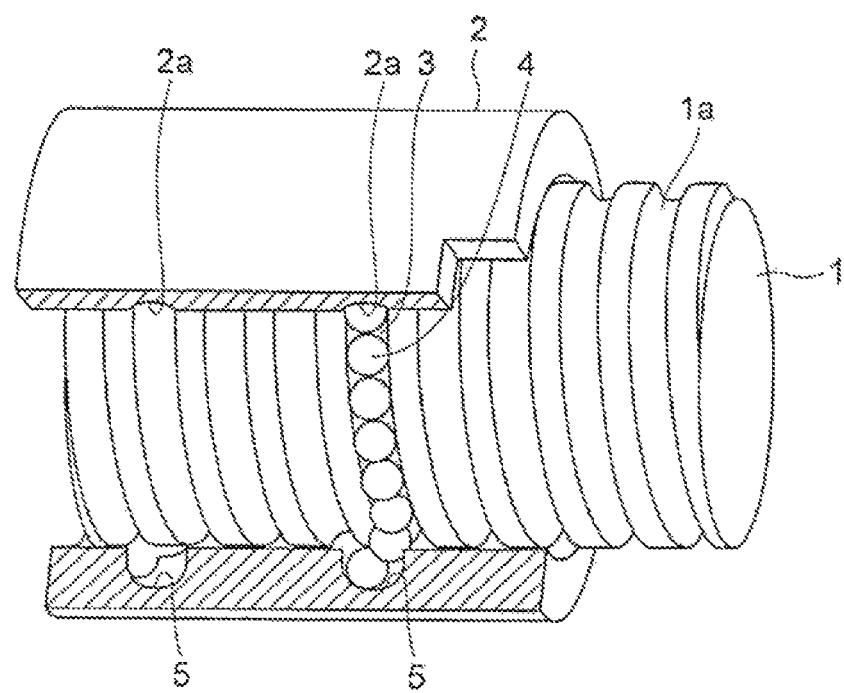
FIG. 2 is a perspective view of the above-mentioned screw device (including a partial cross section)

With reference to the attached drawings, embodiments of the present invention will now be described in detail below. FIGS. 1 and 2 illustrate a screw device according to one embodiment of the present invention. FIG. 1 is a perspective view of the screw device and FIG. 2 is also a perspective view of the screw device (including a partial cross section). In the screw device, a rolling-element rolling groove 1*a* of a screw shaft 1 and a loaded rolling-element rolling groove 2*a* of a nut 2 are aligned to form a rolling-element rolling path 3, and plural balls 4 are arranged in the rolling-element rolling path 3.

On the outer surface of the screw shaft 1, formed as the rolling-element rolling groove is a spiral ball rolling groove 1*a* with a given lead. The cross section of the ball rolling groove 1*a* formed is a Gothic arch groove shape which is combination of two circular arches. The ball rolling groove 1*a* and each ball 4 are in contact with each other at two points.

On the inner surface of the nut 2, formed as the loaded rolling-element rolling groove is a spiral loaded ball rolling groove 2*a* of less than one turn. The loaded ball rolling groove 2*a* has a lead equal to the lead of the ball rolling groove 1*a* of the screw shaft 1. Both ends of the loaded ball rolling groove 2*a* are connected by a return groove 5 that has a back lead which is reverse to the lead of the loaded ball rolling groove 2*a*. The return groove 5 corresponds to a "piece" of a deflector type ball screw. These loaded ball rolling groove 2*a* and return groove 5 consist in a one-turn groove. The structure of the one-turn groove will be described later.

Figure 3:
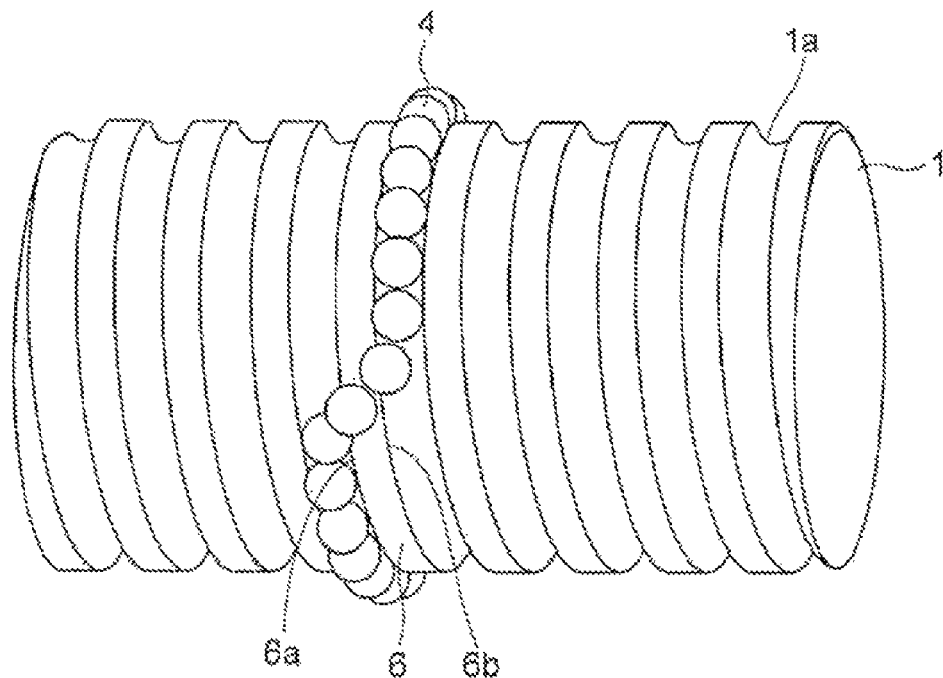
FIG. 3 is a perspective view illustrating balls rolling around the screw shaft.

In the ball rolling path 3 between the loaded ball rolling groove 2*a* and the return groove 5 of the nut 2 and the ball rolling groove 1*a* of the screw shaft 1, a plurality of balls 4 is arranged rollably. While the nut 2 is rotated relative to the screw shaft 1, the plural balls 4 roll under load between the loaded ball rolling groove 2*a* and the ball rolling groove 1*a*. As the loaded ball rolling groove 2*a* and the ball rolling groove 1*a* have a lead, the nut 2 moves in the axial direction of the screw shaft 1. When each ball 4 rolls up to one end of the loaded ball rolling groove 2*a* of the nut 2, the ball 4 goes into the return groove 5. The return groove 5 acts to make each ball 4, which is rolling in the ball rolling groove 1*a* of the screw shaft 1, go over a thread and return one-turn back in the ball rolling groove 1*a*. At this time, the ball 4 goes over the thread 6 while being supported between the edge 6*a* (see FIG. 3) of the thread 6 and the return groove 5 of the nut 2. When the inner diameter of the nut 2 is smaller than the diameter of the center raceway of the ball 4 rolling in the ball rolling groove 1*a* seen in the axial direction of the screw shaft 1, the ball 4 is easily scooped. After the ball 4 goes over the thread 6, the ball falls in the ball rolling groove 1*a* while being supported between the opposite edge 6*b* of the thread 6 and the return groove 5.

Figure 4:
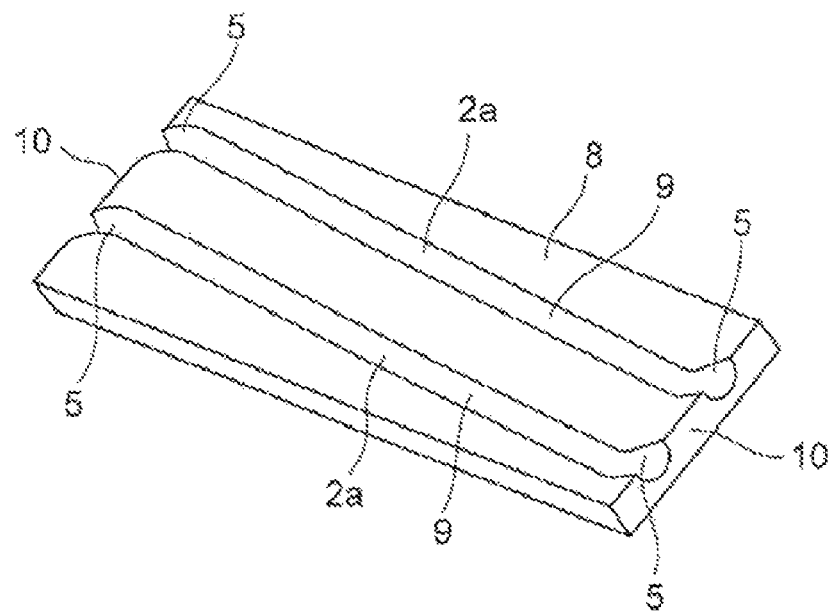
FIG. 4 is a perspective view illustrating a flat plate in which one-turn grooves are formed.
Figure 5:
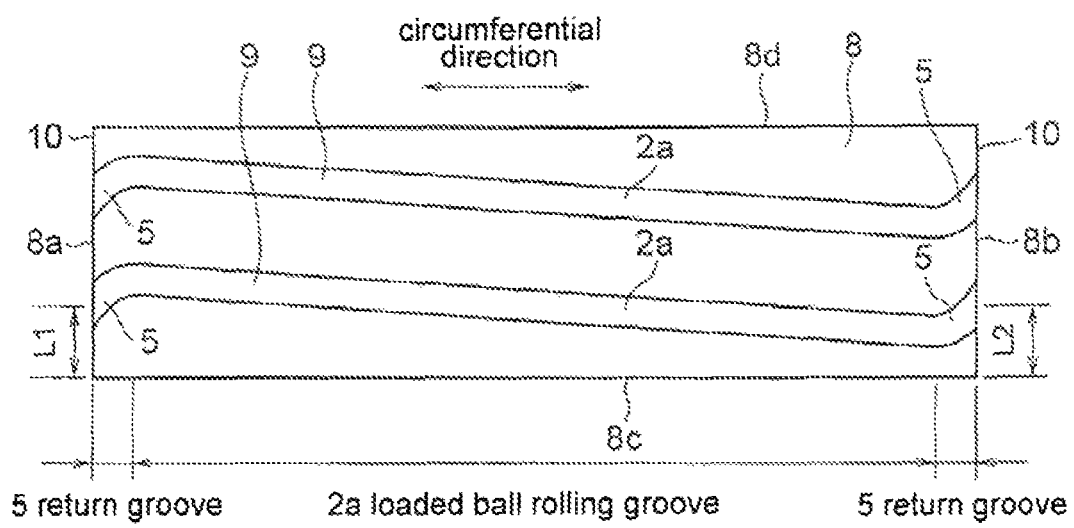
FIG. 5 is a plan view illustrating a flat plate in which one-turn grooves are formed.

Next description is made about a manufacturing method of the screw device according to one embodiment of the present invention. First, as illustrated in FIGS. 4 and 5, a one-turn groove 9 consisting of a loaded ball rolling groove 2*a* and a return groove 5 is formed in a rectangular flat plate 8 (groove forming step). Here, the longitudinal direction of the flat plate 8 becomes a circumference direction of a nut. The raceway of the loaded ball rolling groove 2*a* becomes a straight line inclined by a given lead angle relative to the longitudinal direction of the flat plate 8 in the plane. More specifically, the raceway of the loaded ball rolling groove 2*a* is first designed as a straight line inclined by the lead angle in a developed view of the ball circular diameter when the nut is formed, and then enlarged in the longitudinal direction depending on plastic deformation. With this plastic deformation, the groove becomes straight slightly inclined from the lead angle.

At each end of the loaded ball rolling groove 2*a*, a return groove 5 is formed. The planar shape of the return groove 5 is expressed by combination of a circular arch and a straight line, and the return groove 5 extends to the end of the flat plate 8. More specifically, due to the plastic deformation, the planar shape of the return groove 5 is expressed by combination of an ellipse and a straight line. The return groove 5 is deeper than the loaded ball rolling groove 2*a*.

The one-turn groove 9 extends from one side 8*a* to an opposite side 8*b* that is opposite to the one side 8*a* of the flat plate 8. These sides 8*a* and 8*b* are joined at a joint 10 when the flat plate is bent into a ring. The distance L1 from another side 8*c* of the flat plate 8 to the center of the return groove 5 in the one side 8*a* is equal to the distance L2 from the side 8*c* of the flat plate 8 to the center of the return groove 5 in the opposite side 8*b*. This is because both ends of the return groove 5 in the sides 8*a* and 8*b* are aligned when the flat plate 8 is bent (see FIG. 6). Here, in this example, two one-turn grooves 9 are formed, however, the number of grooves 9 may be set optionally to three, four or the like.

As the flat plate 8 is bent into a ring by deformation processing, the planar shape of the loaded ball rolling groove 2*a* and the return groove 5 is changed when the plate is bent. This is because elongation in the width direction and longitudinal direction when the plate is bent becomes different depending on its part or position. Specifically, the center part in the longitudinal direction of the flat plate 8 is deformed significantly, while end parts in the longitudinal direction of the flat plate 8 are not much deformed in the longitudinal direction as they become free when the plate is bent. The return groove 5 is in a unique shape compared with the loaded ball rolling groove 2*a*. As the return groove 5 of unique shape is arranged at side of the flat plate 8, it is possible to stabilize the planar shape of the loaded ball rolling groove 2*a* between the both sides of the return groove 5.

In addition, the cross-sectional shapes of the loaded ball rolling groove 2*a* and the return groove 5 before the plate is bent are determined in consideration of change in the cross-sectional shapes of the loaded ball rolling groove 2*a* and the return groove 5. Specifically, in this embodiment, in consideration of deformation in the nut forming step, the groove widths and depths of the loaded ball rolling groove 2*a* and the return groove 5 formed in the groove forming step are set larger than the groove widths and depths of the loaded ball rolling groove 2*a* and the return groove 5 when the nut is formed into a ring. Thus, the loaded ball rolling groove 2*a* and the return groove 5 of desired dimensions are obtained when the nut 2 is formed into a ring. This is because, when the plate 8 is bent, the inner side is compressed and plate material is pushed into the loaded ball rolling groove 2*a* and the return groove 5. In view of this phenomenon, the loaded ball rolling groove 2*a* and the return groove 5 are formed.

In a typical ball screw nut, the loaded ball rolling groove is formed having a Gothic arch cross section which is combination of two circular arches. However, in this embodiment the loaded ball rolling groove 2*a* of the nut 2 is formed having a circular arch cross section of a single circular arch. As the loaded ball rolling groove 2*a* has circular arch cross section, the loaded ball rolling groove 2*a* is in contact with each ball 4 at one point, which makes it easy to change the contact point between the ball 4 and the loaded ball rolling groove 2*a*. Thus, even when the lead of the loaded ball rolling groove 2*a* is not formed accurately, variation in contact point advantageously accommodates lead errors. Besides, when a moment load is applied to the nut 2, variation in contact point acts to disperse the load to not only balls 4 positioned in axial ends of the nut 2 but also balls 4 positioned at the center in the axial direction of the nut 2.

As described above, the groove width and depth of the loaded ball rolling groove 2*a* formed in the groove forming step are set larger than those of the loaded ball rolling groove 2*a* when the nut 2 is formed into a ring. Besides, the cross section of the loaded ball rolling groove 2*a* is formed into circular arch shape. Thus, the cross section of the loaded ball rolling groove 2*a* formed in the groove forming step is shaped like a circular arch having a larger curvature radius than that of the cross section of the loaded ball rolling groove 2*a* of the ring-shaped nut 2.

In the manufacturing method of this embodiment, the one-turn groove 9 is formed by cutting the flat plate 8. When cutting is adopted, the one-turn groove 9 can be formed even in a thicker flat plate. This makes it possible to enhance the strength of the nut 2. In addition, cutting has an advantageous effect of accurate forming of the one-turn groove 9. Used as material of the flat plate 8 is carbon steel or the like so that quenching is allowed after the nut 2 is formed into a ring.

The one-turn groove 9 may be grinded after being cut in the flat plate 8. Grinding at this stage is advantageous because the one-turn groove is difficult to grind after the flat plate 8 is bent. Grinding of the one-turn groove 9 enables ball to roll smoothly.

Figure 6:
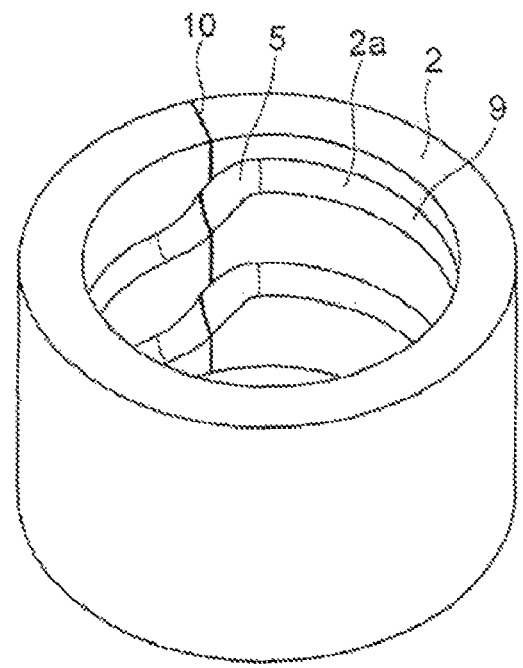
FIG. 6 is a perspective view illustrating a nut wound into a ring.
Figure 7:
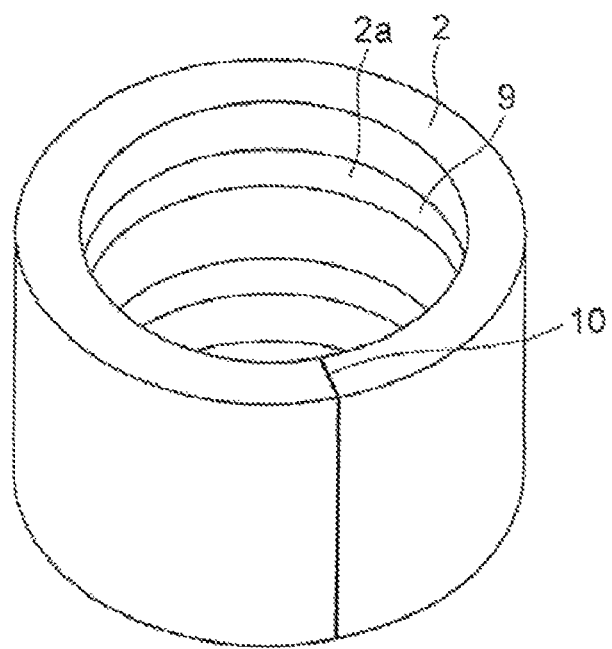
FIG. 7 is a perspective view illustrating a nut wound into a ring.

FIGS. 6 and 7 illustrate a nut 2 bent into a ring. In the nut forming step, the flat plate 8 is bent into a perfect circle by a bending machine. The bending processing includes bender bending which is bending performed by pressing a part of the flat plate 8 with another part of the flat plate 8 supported, roller bending using a roll and the like. As the flat plate 8 is bent into a ring, the both ends of the flat plate 8 are adhered to each other at the joint 10.

Whether a ring-shaped nut 2 is made better or not is determined by circularity of the inner diameter of the nut 2. The circularity of the inner diameter of the nut 2 is managed by making a bar or bushing pass through the nut 2. In order to circulate each ball 4 smoothly, it is necessary to accurately determine the depth of the one-turn groove from the inner diameter of the nut 2. As the width and the depth of the one-turn groove 9 are modified in advance in consideration of the plastic deformation, what is required at this stage is only managing of the inner diameter of the nut 2.

After the nut 2 is formed into a ring, the nut 2 is subjected to quenching. The one-turn groove may be subjected to grinding after quenching. If adequate strength of the nut 2 is achieved, quenching may be omitted.

After the nut 2 and the screw shaft 1 are assembled, the plural balls 4 are disposed in the ball rolling path 3 between the nut 2 and the screw shaft 1. The nut 2 is moved aside near the end of the screw shaft 1, and then, an annular space is created between the loaded ball rolling groove 2a and the return groove 5 of the nut 2 and the ball rolling groove 1a of the screw shaft 1. This is followed by arranging the balls 4 in this annular space.

Figure 8:
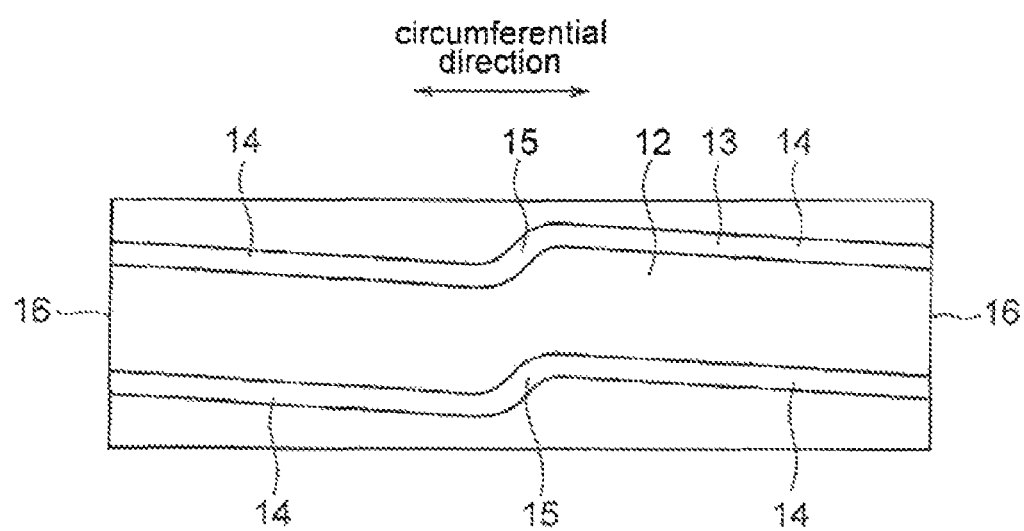
FIG. 8 is a plan view illustrating another example of one-turn grooves formed in the flat plate.

FIG. 8 illustrates another example of a one-turn groove 13 formed in a flat plate 12 in the groove forming step. In this example, two one-turn grooves 13 are formed. Each one-turn groove 13 consists of a loaded ball rolling groove 14 and a return groove 15. The return groove 15 is formed in the center along the longitudinal direction of the flat plate 12. As shown in this example, the return groove 15 may not be formed at a position corresponding to a joint 16. Besides, two return grooves 15 are aligned in this example, however, the phases of the return grooves 15 may be shifted from each other along the circumference of the nut 2 to increase the design flexibility.

Figure 9A:
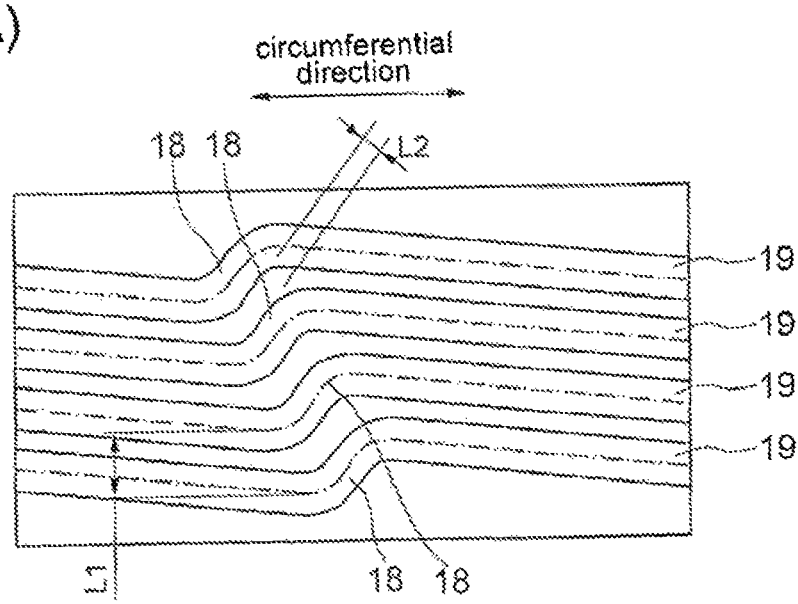
FIGS. 9(A) and 9(B) are plan views each illustrating another example of one-turn grooves formed in the flat plate (FIG. 9(A) illustrates an example of phase-shifted return grooves, and FIG. 9(B) illustrates an example of a parallelogram-shaped flat plate)

FIG. 9(A) illustrates an example of the phases of return grooves 18 which are shifted from each other along the circumference in the groove forming step. As the phases of the return grooves 18 are shifted from each other along the circumference, a sufficient distance is assured between adjacent return grooves 18, even when the distance L between adjacent one-turn grooves 19 is made shorter. Thus, it is possible to prevent interference between adjacent return grooves 18.

Figure 9B:
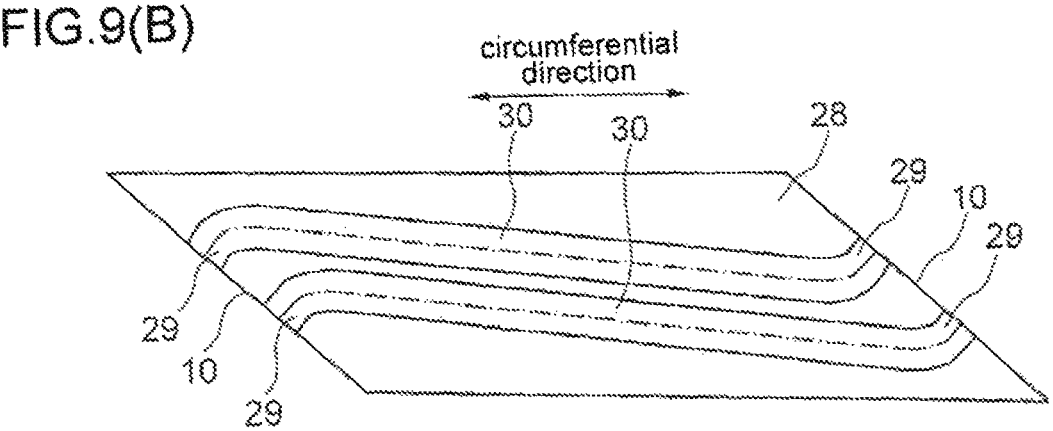

FIG. 9(B) illustrates yet another example in which a flat plate 28 is shaped like a parallelogram. A return groove 29 is arranged at each edge of the flat plate 28 (joint 10). Then, the center line of the return groove 29 is orthogonal to the edge of the flat plate 28. With this structure, the phase of the return groove 29 is necessarily shifted thereby to shorten the distance between adjacent one-turn grooves 30. In addition, as the return groove 29 is cut at a right angle, product stability is achieved.

Figure 10:
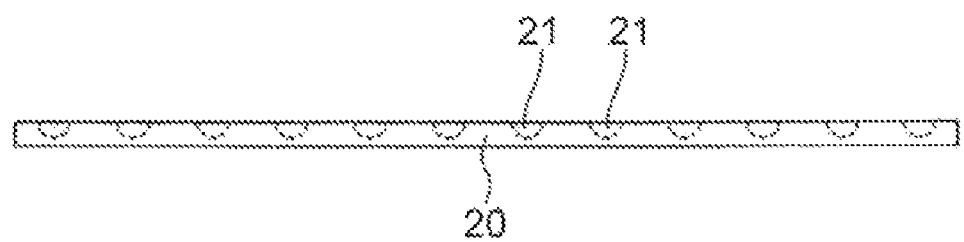
FIG. 10 is a side view illustrating an example of multiple dimples formed on a flat plate.

FIG. 10 illustrates an example of a large number of dimples 21 (recesses) formed at the loaded ball rolling groove side in a flat plate 20 in the groove forming step. Each dimple 21 is formed in the flat plate 20 when the nut 2 is in the form of the flat plate 20. In the ball screw, it is difficult to create a space for storing lubricating oil. However, formation of the multiple dimples 21 enables storing of the lubricating oil in the dimples 21. In addition, as formation of the dimples 21 in the nut 2 gives the nut 2 spring characteristic, when a load is applied to the nut 2, the load can be dispersed to the plural balls.

Figure 11:
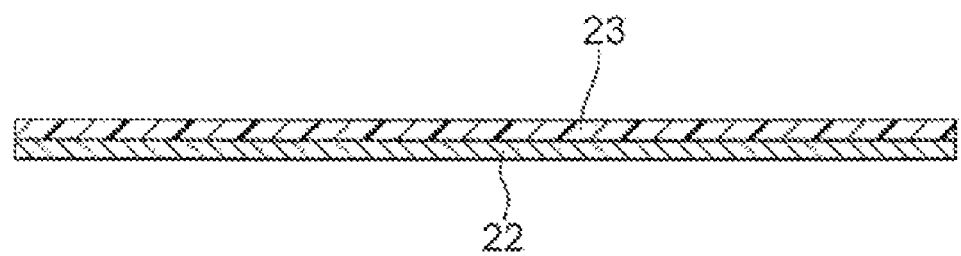
FIG. 11 is a cross-sectional view of a flat plate subjected to lining.

FIG. 11 illustrates, for example, Teflon (registered trademark) lining 23 performed on the loaded ball rolling groove forming side of the flat plate 22 in the groove forming step. As the lining 23 is performed when the nut 22 is in the form of flat plate 22, the lining 23 is well facilitated. Besides, as the lining 23 is in close contact with the screw shaft, it is possible to make the nut 2 serve as a bushing for supporting the screw shaft 1 radially.

Figure 12:
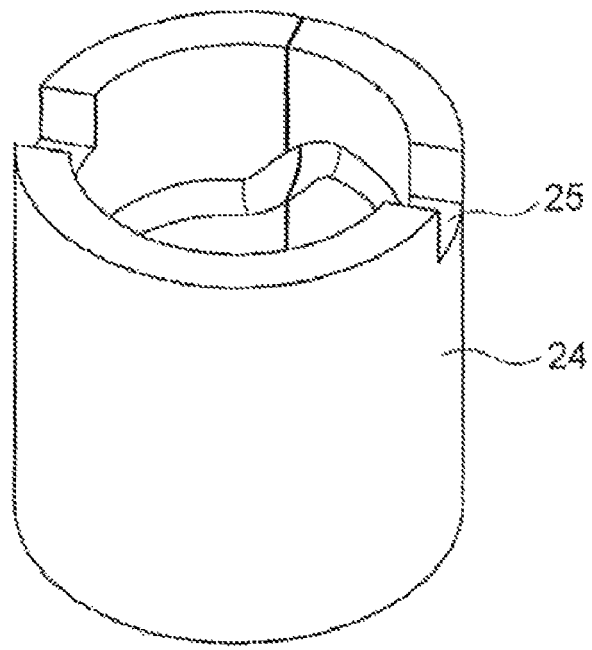
FIG. 12 a perspective view of a nut having notches formed therein.
Figure 13:
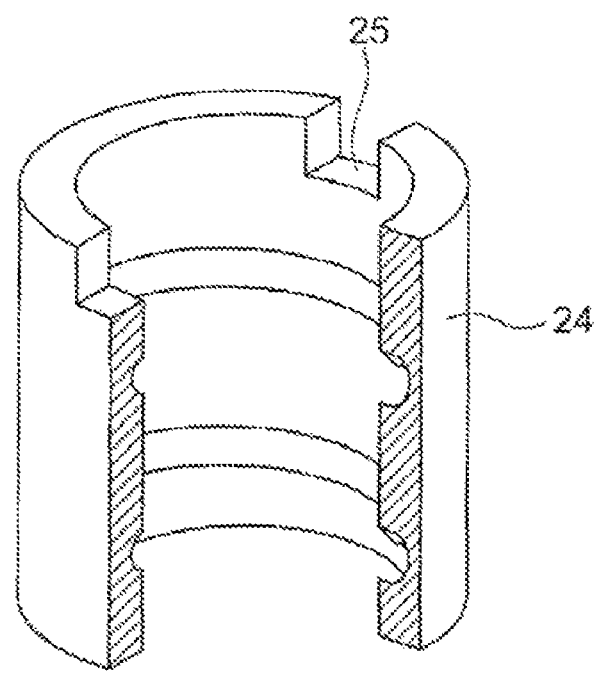
FIG. 13 a perspective view of a nut having notches formed therein (including a partial cross section)

FIGS. 12 and 13 illustrate another example of a nut 24 formed in the screw device manufacturing method of the above-described first embodiment. In this nut 24, notches 25 are formed when the nut 24 is still a flat plate, and then, the flat plate is bent into a ring. Each notch 25 can be formed without cutting a part of the nut by milling or the like. As the nut 24 is made of sheet metal, the notch 25 can be easily formed for attaching the nut 24 to another member. This notch of the nut 24 is for attaching the nut 24 to the other member to prevent rotation of the nut 24.

Figure 14:
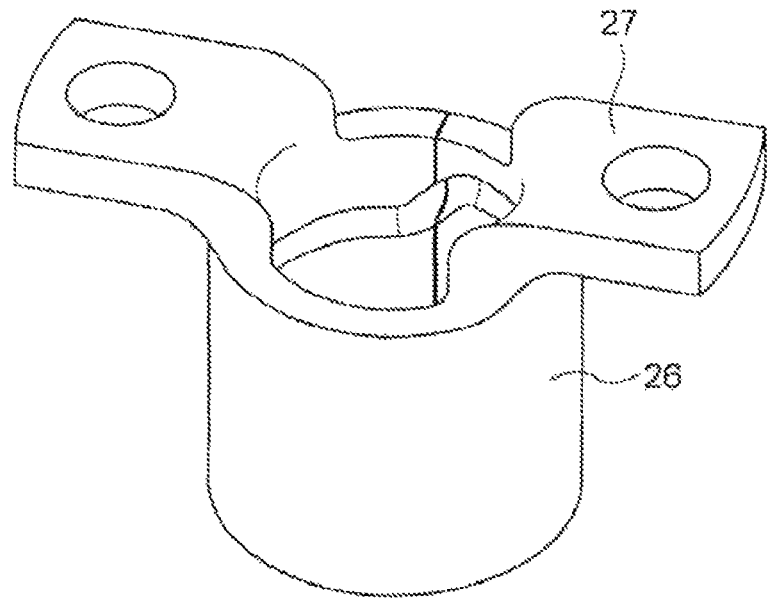
FIG. 14 a perspective view of a nut having flanges formed thereon.
Figure 15:
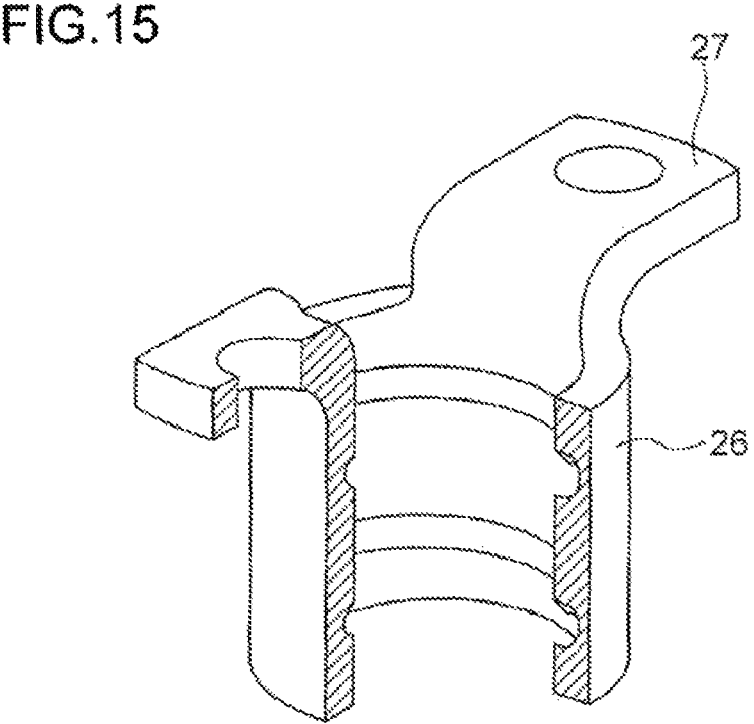
FIG. 15 a perspective view of a nut having flanges formed thereon (including a partial cross section)

FIGS. 14 and 15 illustrate another example of a nut 26 formed in the screw device manufacturing method of the above-described first embodiment. In this nut 26, flanges 27 are integrally formed when the nut 26 is still a flat plate. Then, the flat plate is bent into a ring, each flange 27 is bent outward and thereby the flange 27 can be easily formed integrally with the nut 26. As the nut 26 is made of a sheet metal, the flange can be easily made for attaching the nut 26 to another member. This flange 27 of the nut 26 is attached to the other member for preventing rotation of the nut 26.

The following provides a summary of features of a screw device manufactured by a screw device manufacturing method according to the above-described first embodiment.

As illustrated in FIG. 5, as the groove forming step of forming the one-turn groove 9 in the flat plate 8 is followed by the nut forming step of bending the flat plate 8 into a ring, the adequate strength of the nut 2 can be easily ensured. Besides, it is possible to keep high compression stress left in the loaded ball rolling groove 2a in the inner surface of the nut 2. Preferably, the loaded ball rolling groove has high strength as balls 4 roll in the loaded ball rolling groove.

The yield of materials is high, and mass production is well expected. As the nut 2 is formed of the flat plate 8 and is not cut off from a cylindrical body, extremely high yield is expected.

It is possible to manufacture a nut 2 having a large ratio L/D of the length L and the diameter D and having a small diameter. Generally, it is difficult to manufacture a loaded ball rolling groove 2a in the long and small-diameter nut 2 by machining such as cutting or the like. However, as the loaded ball rolling groove 2a is formed in the flat plate 8 in the manufacturing method of this embodiment, the loaded ball rolling groove 2a can be easily formed even in the nut having a large L/D ratio and a small diameter. Besides, as the L/D ratio is increased, the screw device manufactured can bear large moment loads.

As the nut 2 is made of sheet metal, it is possible to form a notch, a flange and the like integrally.

If the nut 2 formed into a ring has its ends slightly separated from each other at the joint, great elasticity can be expected in the nut 2 and the nut 2 of high elasticity can be used to be press-fitted into holes with rough tolerance.

By use of spring characteristics of the whole ring of the nut 2, compression loads, or preloads, can be applied to balls 4.

As the nut 2 has spring characteristics, it is possible to reduce edge loads (excessive loads applied to balls 4 when the balls 4 move to the edge of the loaded ball rolling groove 2*a*).

Figure 16:
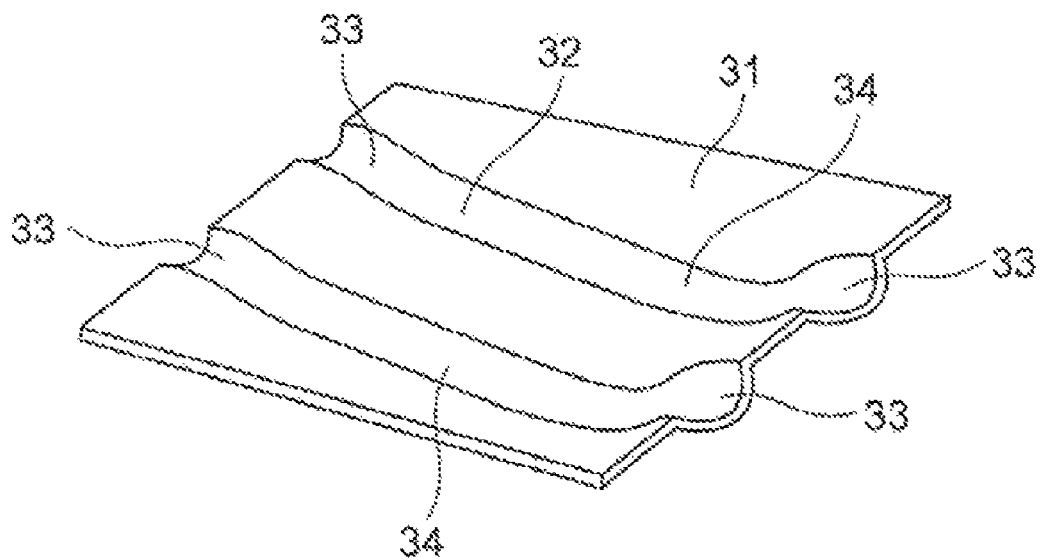
FIG. 16 is a perspective view illustrating an example of one-turn grooves formed in the flat plate by press working.
Figure 17:
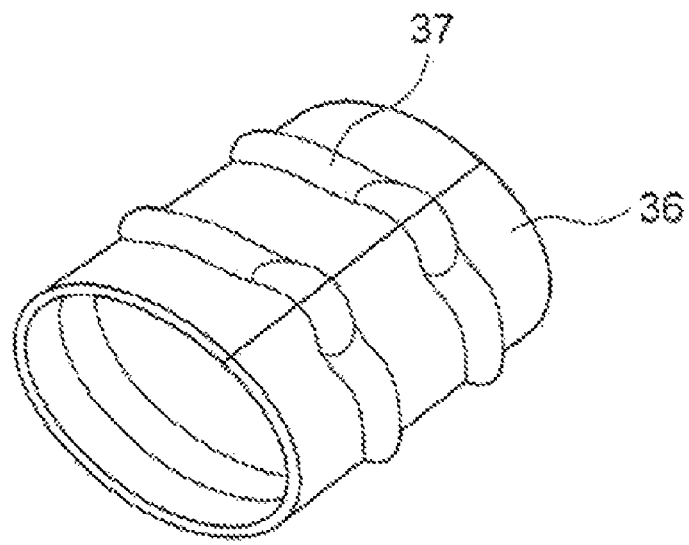
FIG. 17 is a perspective view illustrating an example of a nut formed by bending a flat plate into a ring.
Figure 18:
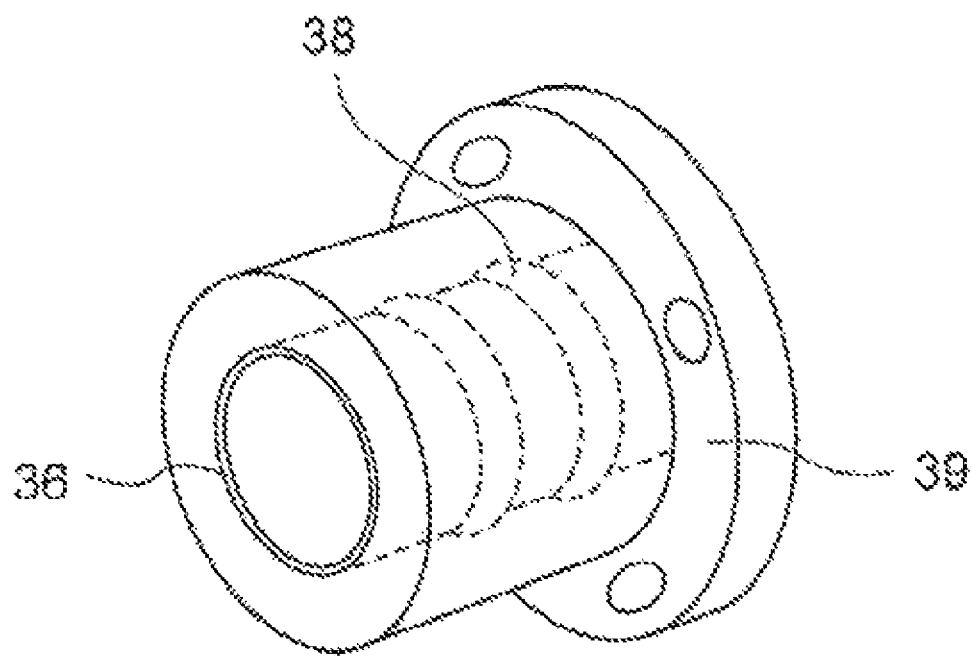
FIG. 18 is a perspective view illustrating a die-casting around the nut.

FIGS. 16 to 18 illustrate the process of screw device manufacturing method according to a second embodiment of the present invention. First, as illustrated in FIG. 16, each one-turn groove 34, which consists of a loaded ball rolling groove 32 and a return groove 33, is formed in a flat plate 31 by press working (groove forming step). The pressing processing utilizes a die. The planar shape and the cross-sectional shape of the one-turn groove 34 are the same as those of the one-turn groove 9 shown in FIG. 5. However, as the one-turn groove 34 is formed by press working, there are formed protuberances on the back surface of the flat plate 31. According to the manufacturing method of this embodiment, the one-turn groove 34 is press-formed in the flat plate 31, which makes it possible to enhance productivity of the nut.

As illustrated in FIG. 17, the nut 36 is formed by bending a flat plate into a ring (nut forming step). On the outer surface of the nut 36, protuberances 37 are formed due to pressing processing. Then, as illustrated in FIG. 18, a housing 38 is formed as a reinforcing member around the nut 36 by die casting or the like (reinforcing member forming step). On the housing 38, a flange 39 is integrally formed. As the protuberances 37 on the outer surface of the nut are molded into the die-cast housing 38, it is possible to prevent axial separation of the housing 38 from the nut 36. This enables elimination of the need of stepping, a retaining ring, a groove or the like for prevention of axial separation of the nut 36 from the housing 38.

The present invention is not limited to the above-described embodiments and can be embodied in various forms without departing from the spirit of the present invention. For example, in the present embodiment, a return groove is formed in the nut to circulate balls in the deflector system. However, the return groove may not be provided in the nut to circulate balls by the return-pipe system or end-cap system. Further, a spacer may be provided between each two of balls to prevent contact between the balls, and spacers may be held in series by a band member. Furthermore, the screw device of the present embodiment is applicable not only to an electric power steering device but also to a stage, a robot, a machine tool and the line.

The present specification is based on Japanese Patent Application No. 2005-221071 filed on Jul. 29, 2005, the entire contents of which are entirely incorporated by reference herein.

The invention claimed is:

1. A screw device comprising:
a screw shaft having an outer surface with a rolling-element rolling groove spirally formed thereon;
a nut having an inner surface with at least one one-turn groove formed thereon including a loaded rolling-element rolling groove of less than one turn facing the rolling-element rolling groove of the screw shaft and a return groove connecting both ends of the loaded rolling-element rolling groove; and
a plurality of rolling elements disposed between the rolling-element rolling groove of the screw shaft and the one-turn groove of the nut,
wherein the loaded rolling-element rolling groove and the return groove that has a back lead which is reverse to the lead of the loaded rolling-element rolling groove are first formed in a flat plate by cutting so that the groove widths and depths of the loaded rolling-element rolling groove and the return groove in the flat plate are set larger than the groove widths and depths of the loaded rolling-element rolling groove and the return groove when a nut is formed into a ring and the nut is formed by bending the flat plate into the ring.

2. The screw device according to claim 1, wherein the return groove is positioned at a joint of the nut formed into the ring.

3. A screw device manufacturing method of a screw device having a plurality of rolling elements disposed between a spiral rolling-element rolling groove of a screw shaft and at least one one-turn groove of a nut including a spiral loaded rolling-element rolling groove of less than one turn facing the rolling-element rolling groove of the screw shaft and a return groove connecting both ends of the loaded rolling-element rolling groove, comprising:
a groove forming step of forming the loaded rolling-element rolling groove and the return groove that has a back lead which is reverse to the lead of the loaded rolling-element rolling groove in a flat plate by cutting so that the groove widths and depths of the loaded rolling-element rolling groove and the return groove in the flat plate are set larger than the groove widths and depths of the loaded rolling-element rolling groove and the return groove when the nut is formed into a ring; and
a nut forming step, after the groove forming step, of forming the nut by bending the flat plate, having the rolling-element rolling groove and the return groove already formed therein in the groove forming step, into the ring.

4. The screw device manufacturing method according to claim 3, wherein in the nut forming step, the return groove is positioned at a joint of the nut formed into the ring.

\* \* \* \* \*